United States Patent
Komatsu

(10) Patent No.: US 6,405,774 B1
(45) Date of Patent: Jun. 18, 2002

(54) RUBBER REINFORCING STEEL CORD AND HEAVY DUTY PNEUMATIC RADIAL TIRE USING THE STEEL CORD

(75) Inventor: Ryuzo Komatsu, Hiratsuka (JP)

(73) Assignee: The Yokohama Co., Ltd., Tokyo (JP)

(*) Notice: Subject to any disclaimer, the term of this patent is extended or adjusted under 35 U.S.C. 154(b) by 0 days.

(21) Appl. No.: 09/600,173

(22) PCT Filed: Dec. 22, 1999

(86) PCT No.: PCT/JP99/07207

§ 371 (c)(1),
(2), (4) Date: Aug. 3, 2000

(87) PCT Pub. No.: WO00/39386

PCT Pub. Date: Jul. 6, 2000

(30) Foreign Application Priority Data

Dec. 25, 1998 (JP) .......................................... 10-370752

(51) Int. Cl.⁷ .............................. B60C 9/00; B60C 9/02; B60C 9/04; B60C 9/08; D07B 1/06; D07B 1/08

(52) U.S. Cl. ........................... 152/556; 57/212; 57/213; 57/311; 57/902; 152/451

(58) Field of Search ................................ 152/451, 527, 152/556; 57/902, 212, 213, 311

(56) References Cited

U.S. PATENT DOCUMENTS

H1505 H * 12/1995 Oguro ........................ 57/902 X

FOREIGN PATENT DOCUMENTS

JP         10292277 A * 11/1998 ................... 152/451

* cited by examiner

Primary Examiner—Adrienne C. Johnstone
(74) Attorney, Agent, or Firm—Radar, Fishman & Grauer

(57) ABSTRACT

A rubber reinforcing steel cord of a bundle-twisted+layer-twisted structure obtained by arranging 9 steel filaments around 3 steel filaments each being two-dimensionally wave-like shaped in the lengthwise direction, intertwining all of these steel filaments in one operation to form a bundle-twisted cord, and further arranging 14 steel filaments around the bundle-twisted cord followed by intertwining. Also, a heavy duty pneumatic radial tire using the rubber reinforcing steel cord as the cord of the carcass layer thereof.

4 Claims, 4 Drawing Sheets

FIG. 5 COMPARATIVE
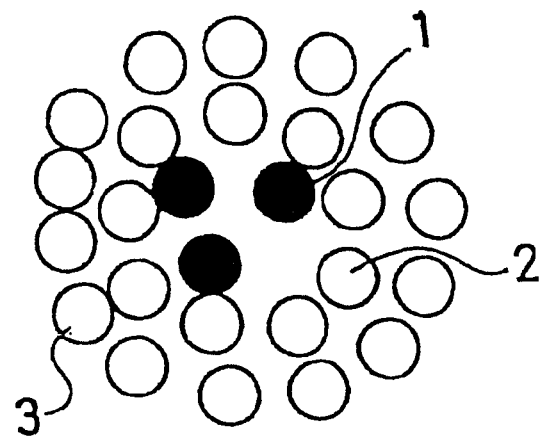
FIG. 6 COMPARATIVE
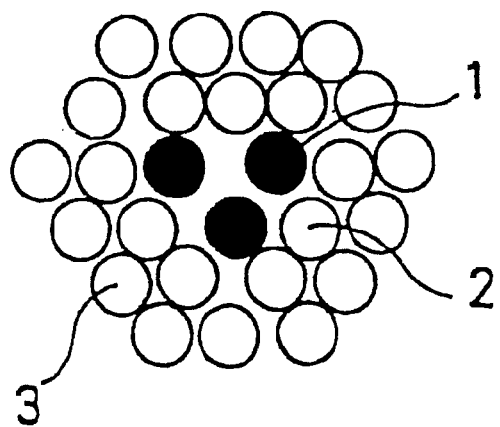

FIG. 7 COMPARATIVE
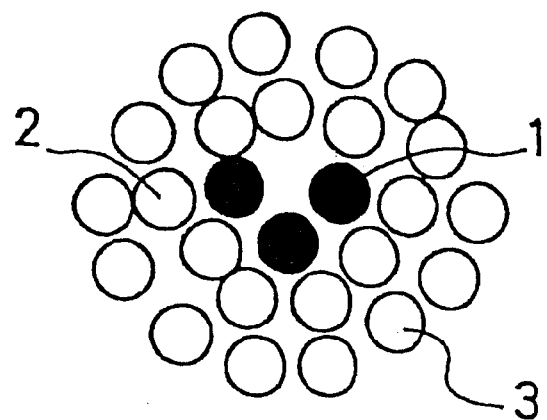
FIG. 8 COMPARATIVE
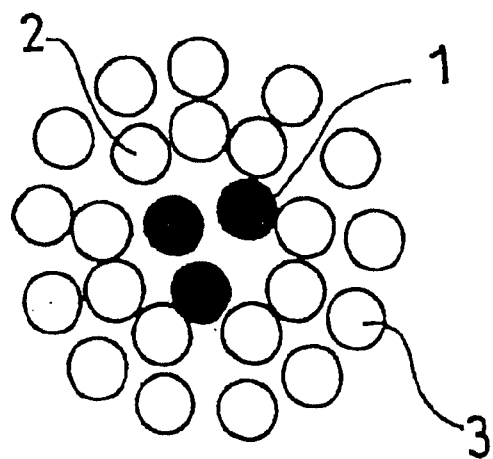

RUBBER REINFORCING STEEL CORD AND HEAVY DUTY PNEUMATIC RADIAL TIRE USING THE STEEL CORD

TECHNICAL FIELD

The present invention relates to a rubber reinforcing steel cord, which is excellent in the rubber permeability and the fatigue resistance and also has a high productivity, and to a heavy duty pneumatic radial tire using the steel cord as the cord for the carcass layer.

BACKGROUND OF THE INVENTION

Hitherto, in a heavy duty pneumatic radial tire used for large vehicles such as trucks, buses, etc., in order to make endurable heavy load, steel cords are frequently used as cords for the carcass layers forming the tire skeleton.

As the steel cord, as shown in FIG. 3, a layer-twisted structure of 3+9+15+W obtained by intertwining nine (9) steel filaments 2 around a core portion formed by intertwining three (3) steel filaments 1, intertwining 15 steel filaments 3 around the 9 steel filaments 2, and further binding them by wrapping a wrapping filament W around the outside of them; and a bunched structure (bundle-twisted structure) of 1×12+W obtained by intertwining 12 steel filaments and binding them by wrapping a wrap filament around the outside of them, or of 1×27+W obtained by intertwining 27 steel filaments and binding them by wrapping a wrap filament around the outside of them are generally used. In addition, the wrap filament is for binding the intertwined steel filaments so that the cord is not dispersed.

However, in these steel cords of the layer-twisted structure or the bunched structure, there was a problem that because of the existence of the wrap filament, fretting occurred between the wrap filament and the steel filaments just under the wrap filament during the use to lower the strength of the steel filament, which resulted in lowering the fatigue resistance of the steel cord.

Also, in the steel cord of the layer-twisted structure, there was a problem that because of the closest structure having no gaps amount the steel filaments, a rubber permeability into the inside of the cord was bad, whereby when water penetrated during the use or storage of the tire reached the cord, the cord was corroded to lower the corrosion resistance and the fatigue resistance. On the other hand, in the steel cord of the bunched structure, the productivity can be improved because the number of the production steps is less as compared with the steel cord of the layer-twisted structure but there was a problem that because the structure was also the closest structure as the layer-twisted structure, the rubber permeability into the inside of the cord was bad.

Thus, recently, for improving lowering of the fatigue resistance by fretting, a steel cord having no rap filament is proposed (Japanese patent application Kokai publication No. 8-176977), wherein the cord is a three-layer structure as shown in FIG. 4 but the number of steel filaments of out outermost layer is reduced by one or two than the closest number (the maximum number capable of being disposed) of steel filaments to increase the rubber permeability of the outermost layer (3+9+14 layer-twisted structure in FIG. 4) and the cord is bound by the permeated rubber. However, in the steel cord, because other inside layers than the outermost layer are the closest structure, the rubber permeability is insufficient.

Also, a steel cord of the layer-twisted structure or the bunched structure using at least one wave-like shaped steel filament at the core portion for increasing the rubber permeability is proposed (Japanese patent application Kokai publication No. 9-31875). However, in the steel cord, the rubber permeability is improved but the form of the cross section of the cord does not become a homogeneous round (becomes distorted), when the steel cord is used as a cord of the carcass layer and a largely bending input force is applied to the cord, an ununiform strain occurs in the cord, whereby the fatigue resistance of the cord is lowered. An embodiment of the cord is shown in FIG. 5. The embodiment of FIG. 5 is a structure that one of three steel filaments of the core portion is wave-like shaped and in the embodiment, a steel cord of a layer-twisted structure of 3Cr+9+14 is constructed by intertwining 9 steel filaments 2 around the core portion formed by intertwining 3 steel filaments including the one above-described steel filament and intertwining 14 steel filaments 3 around the 9 steel filaments 2 (wherein, Cr means a wave-like shaped form). However, in the steel cord of FIG. 5, the cord is produced by three times twisting, which is disadvantageous in the production cost.

As other steel cords, for example, the steel cords shown in FIG. 6 and FIG. 7 are proposed. In the embodiment of FIG. 6, a steel cord of the bunched structure of 3Cr/24 obtained by disposing total 24 steel filaments 2 and 3 around three(3) steel filaments 1 wave-like shaped in the lengthwise direction is constructed. In the steel cord of FIG. 6, the productivity is high because the production step is one-time twisting only but because the cross-sectional form of the cord is nearly a triangle (straw bag form) and thus a strain becomes ununiform, the fatigue resistance is inferior and also because the steel cord has almost the closest structure, the rubber permeability is insufficient. In the embodiment shown in FIG. 7, a steel cord of the layer- twisted structure of 3Cr+9+14 obtained by intertwining 9 steel filaments 2 around a core portion formed by arranging 3 steel filaments 1 wave-like shaped in the lengthwise direction without intertwining, and intertwining 14 steel filaments 3 around the 9 steel filaments 2 is constructed. In the steel cord of FIG. 7, because 3Cr of the core portion are straight, when a cord tension is applied, the tension burden is largely applied to the core portion (the core portion is stretched), the partial charge of the tension becomes ununiform and the fatigue resistance is no good.

DISCLOSURE OF THE INVENTION

The present invention provides a rubber reinforcing steel cord being excellent in the rubber permeability and the fatigue resistance and also having a high productivity and also the invention provides a heavy duty pneumatic radial tire using the above-described steel cord as the cord of the carcass layer.

That is, the rubber reinforcing steel cord of the invention is a steel cord of a bundle-twisted+layer-twisted structure obtained by arranging 9 steel filaments around three steel filaments 1 each being two-dimensionally wave-like shaped in the lengthwise direction, intertwining all of these steel filaments in one operation to form a bundle-twisted cord, and further arranging 14 steel filaments around the bundle-twisted cord followed by intertwining, wherein when the diameter of the two-dimensionally wave-like shaped steel filament is d, the wave-form height thereof is h, and the wave form pitch thereof is P, the parameter F shown by (h−d)/P is in the relation of $0.001 \leq F \leq 0.03$ and further, the ratio b/a of the long diameter a' and the short diameter b of the circumscribed circle of the cross section of the bundle-twisted cord is $0.94 \leq b/a \leq 1.00$, and the ratio b'/a' of the long diameter a' and the short diameter b' of the circumscribed circle of the cross section of the steel cord is $0.96 \leq b'/a' \leq 1.00$.

As described above, in the invention, because the 3 steel filaments of the core portion are wave-like shaped in the lengthwise direction, the existence of gaps in the core portion is ensured and thus the rubber permeability of the cord becomes good. Also, because the steel cord of the invention has the bundle-twisted+layer-twisted structure having the above-described core portion, the cross sectional form of the steel cord can be made almost homogeneous and round and thus, when a large bending input force is applied to the steel cord, an ununiform strain does not occur in the steel cord, whereby the fatigue resistance of the steel cord is not lowered. Furthermore, because the steel cord of the invention has the bundle-twisted+layer-twisted structure, the number of the production steps can be reduced as compared with the relates art layer-twisted structure, whereby the productivity can be increased.

Also, in the heavy duty pneumatic radial tire of the invention using the above-described rubber reinforcing steel cord excellent in the rubber permeability and the fatigue resistance as described above as the cord of the carcass layer, the durability can be increased.

BRIEF DESCRIPTION OF THE DRAWINGS

FIG. 5 is a cross-sectional view of still other embodiment of a related art rubber reinforcing steel cord, FIG. 6 is a cross-sectional view of other embodiment of a related art rubber reinforcing steel cord, FIG. 7 is a cross-sectional view of still other embodiment of a related art rubber reinforcing steel cord, and FIG. 8 is a cross-sectional view of an embodiment of the rubber reinforcing steel cord wherein the outermost layer is constituted of 13 steel filaments.

BEST MODE FOR CARRYING OUT THE INVENTION

Figure 1:
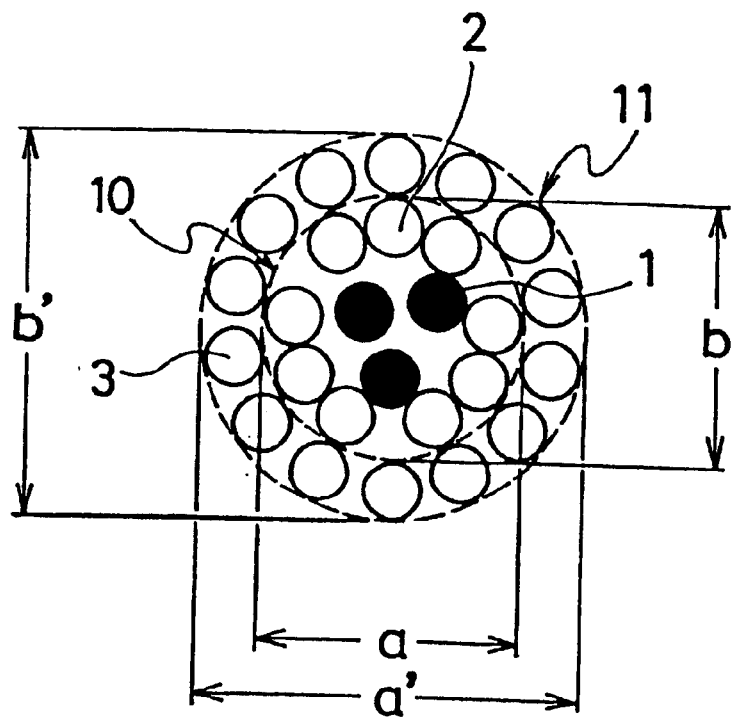
FIG. 1 is a cross-sectional view of an embodiment of the rubber reinforcing steel cord of the invention.

As shown in FIG. 1, the rubber reinforcing steel cord 11 of the invention is the steel cord having a bundle-twisted+layer-twisted structure (the twisted structure of 3 Cr/9+14) obtained by arranging 9 steel filaments 2 around three steel filaments 1 each-being two-dimensionally wave-like shaped in the lengthwise direction, intertwining all of these steel filaments in one operation to form a bundle-twisted cord 10, and further arranging 14 steel filaments 3 around the bundle-twisted cord 10 followed by intertwining.

Figure 2:
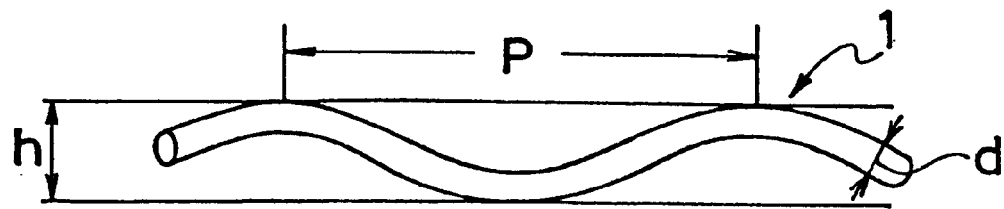
FIG. 2 is a side view explaining an embodiment of the steel filament constituting the core portion of the rubber reinforcing steel cord of the invention.

Each of the three steel filaments of the core portion is two-dimensionally wave-like shaped in the lengthwise direction as shown in FIG. 2, and when the diameter of the steel filament is d, the wave form height thereof is h, and the wave form pitch thereof is P, the parameter F shown by (h−d)/P is in the relation of $0.001 \leq F \leq 0.03$.

When F is less than 0.001 (F<0.001), the shape of the wave form becomes near straight, whereby gaps do not form amount the 9 element (steel filaments) outside the core portion and thus the rubber permeability becomes inferior. Also, when F exceeds 0.03 (F>0.03), when a cord tension is applied, the burden of the tension become ununiform between the core portion and the side portion to lower the fatigue resistance.

In the invention, because the steel cord is the bundle-twisted+layer-twisted structure having the above-described core portion, the cross sectional form of the steel cord can be make almost homogeneous and round but in order to make more round, the ratio b/a of the long diameter a and the short diameter b of the circumscribed circle of the cross section of the bundle-twisted cord 10 is $0.94 \leq b/a \leq 1.00$, and the ratio b'/a' of the long diameter a' and the short diameter b' of the circumscribed circle of the cross section of the steel cord 11 is $0.96 \leq b'/a' \leq 1.00$. Thereby, when a large bending input force is applied to the steel cord 11, the fatigue resistance of the steel cord can be more increased. Also, by making the cross sectional form such a round, the dispositions of the steel filaments 1, 2, and 3 become line symmetry, whereby the occurrence of an ununiform strain in the steel cord 11 can be prevented.

The number of the steel filaments 3 constituting the outermost layer of the steel cord 11 is 14 which is less than the closest number (the maximum number capable of being disposed, that is 15) by one. By using 14 steel filaments, gaps form between each filaments in the outermost layer, whereby the penetration of a rubber into the inside of the steel cord becomes easy. Thereby, a wrapping filament can be omitted. Also, when the number of the steel filaments constituting the outermost layer is less than 14, for example, is 13 as shown in FIG. 8, the diameter of the steel filaments must be increased to keep the necessary strength as the cord, whereby the fatigue resistance is undesirably lowered.

Also, from the view point of the production cost of the steel cord, it is preferred that the diameter of each of the steel filaments 1, 2, and 3 constituting the steel cord 11 is same. Furthermore, form the points of the productivity and the form of the cord, it is preferred that the twisting pitch $P_1$ of the bundle-twisted cord 10 and the twisted pitch $P_2$ of the plural filaments 3 of the outermost layer disposed around the bundle-twisted cord 10 are in the relation of $P_2 \geq 2.5+P_1$. This is because, if $P_2 < 2.5+P_1$, the filaments of the outermost layer are liable to be fallen in the bundle-twisted cord 10 and also the productivity becomes bad.

EXAMPLES, RELATED ART EXAMPLES, AND COMPARATIVE EXAMPLES

Using the steel cords having the various constructions shown in Table 1 and Table 2 below as the cords (carcass cords) of carcass layers, heavy duty pneumatic radial tires of a tire size of 1000R 20 14PR (Examples 1 to 6, Related Art Examples 1 and 2, and Comparative Examples 1 to 8) were prepared and about these tires, the rubber permeability and the fatigue resistance were evaluated. The results are also shown in Table 1 and Table 2 together. In addition, in Table 1 and Table 2, "Core 3 inside" means the rubber permeability of the inside of the core of 3 crimped steel filaments, "Between core 3 and side 9" means the rubber permeability between 3 crimped steel filaments of the core and 9 steel filaments of outside of the core, and "Between side 9 and outermost sheath" means the rubber permeability between the 9 steel filaments of the outside of the core and the steel filaments of the outermost sheath or layer.

TABLE 1

Figure 3:
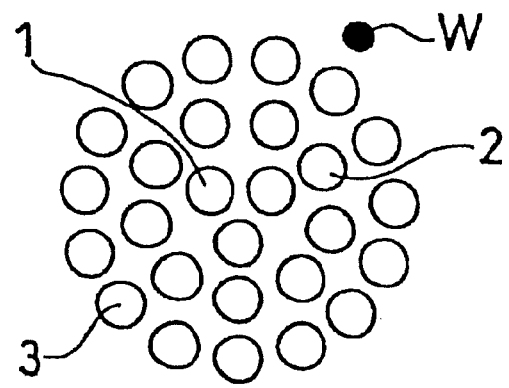
FIG. 3 is a cross-sectional view of an embodiment of a related art rubber reinforcing steel cord.
Figure 4:
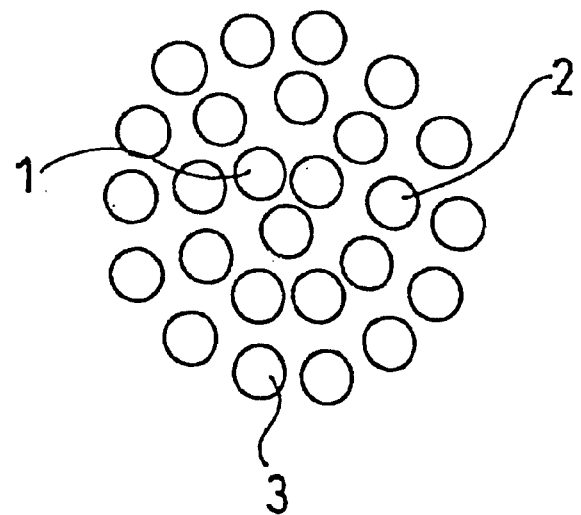
FIG. 4 is a cross-sectional view of other embodiment of a related art rubber reinforcing steel cord.

|  | Example 1 | Example 2 | Example 3 | Example 4 | Example 5 | Example 6 | Related art example 1 | Related art example 2 |
|---|---|---|---|---|---|---|---|---|
| Twisted structure | 3Cr/9 + 14 | 3Cr/9 + 14 | 3Cr/9 + 14 | 3Cr/9 + 14 | 3Cr/9 + 14 | 3Cr/9 + 14 | 3 + 9 + 15 + w | 3 + 9 + 14 |
| Cross-sectional view of steel cord | FIG. 1 | FIG. 1 | FIG. 1 | FIG. 1 | FIG. 1 | FIG. 1 | FIG. 3 | FIG. 4 |
| Filament diameter (mm) | 0.170 | 0.170 | 0.170 | 0.170 | 0.170 | 0.170 | 0.170 | 0.170 |
| Crimped steel filament number | 3 | 3 | 3 | 3 | 3 | 3 | 0 | 0 |
| Roundness |  |  |  |  |  |  |  |  |
| b/a | 0.945 | 0.945 | 0.945 | 0.985 | 0.94 | 0.945 | 0.98 | 0.96 |
| b'/d' | 0.97 | 0.97 | 0.97 | 0.99 | 0.96 | 0.96 | 0.985 | 0.97 |
| Parameter F | 0.003 | 0.001 5 | 0.025 | 0.003 | 0.003 | 0.003 | — | — |
| Pitch $P_1/P_2$ | 10/16 | 10/16 | 10/16 | 10/16 | 10/16 | 10/12 | — | — |
| Rubber permeability (%)*1 |  |  |  |  |  |  |  |  |
| Core 3 inside | 50 | 30 | 50 | 50 | 50 | 30 | 0 | 0 |
| Between core 3 and side 9 | 80 | 65 | 85 | 80 | 80 | 75 | 15 | 15 |
| Between side 9 and outermost sheath | 95 | 90 | 95 | 95 | 95 | 90 | 30 | 80 |
| Fatigue retention (%) (fatigue resistance)*2 | 95 | 90 | 90 | 97 | 88 | 88 | 30 | 60 |

Note)
*1The rubber permeability of a carcass cord taken out from a new tire.
*2Each cord was taken out from a tire after running 200,000 km and a new tire, a rotary bending fatigue test (under constant stress) was applied to each cord, the rotation number until the cord was broken was measured.
(value after running/value at new × 100 (%))

TABLE 2

|  | Comparative Example 1 | Comparative Example 2 | Comparative Example 3 | Comparative Example 4 | Comparative Example 5 | Comparative Example 6 | Comparative example 7 | Comparative example 8 |
|---|---|---|---|---|---|---|---|---|
| Twisted structure | 3Cr + 9 + 14 | 3Cr/24 | 3Cr + 9 + 14 | 3Cr/9 + 14 | 3Cr/9 + 14 | 3Cr/9 + 14 | 3Cr/9 + 14 | 3Cr/9 + 13 |
| Cross-sectional view of steel cord | FIG. 5 | FIG. 6 | FIG. 7 | FIG. 1 | FIG. 1 | FIG. 1 | FIG. 1 | FIG. 8 |
| Filament diameter (mm) | 0.170 | 0.170 | 0.170 | 0.170 | 0.170 | 0.170 | 0.170 | 0.175 |
| Crimped steel filament number | 1 | 3 | 3 | 3 | 3 | 3 | 3 | 3 |
| Roundness |  |  |  |  |  |  |  |  |
| b/a | 0.90 | 0.85 | 0.92 | 0.945 | 0.945 | 0.92 | 0.92 | 0.945 |
| b'/d' | 0.96 | 0.85 | 0.94 | 0.97 | 0.97 | 0.97 | 0.95 | 0.97 |
| Parameter F | 0.049 | 0.049 | 0.049 | 0.0007 | 0.035 | 0.003 | 0.003 | 0.003 |
| Pitch $P_1/P_2$ | — | — | — | 10/16 | 10/16 | 10/16 | 10/16 | — |
| Rubber permeability (%)*1 |  |  |  |  |  |  |  |  |
| Core 3 inside | 0 | 0 | 0 | 0 | 50 | 50 | 50 | 50 |
| Between core 3 and side 9 | 40 | 20 | 35 | 30 | 80 | 80 | 80 | 80 |
| Between side 9 and outermost sheath | 85 | 80 | 85 | 80 | 95 | 95 | 95 | 100 |
| Fatigue retention (%) (fatigue resistance)*2 | 60 | 30 | 70 | 60 | 70 | 80 | 75 | 75 |

2 Note) *1 and *2 are same as in Table 1.

In Table 1, Example 6 is the case of $P_2<2.5+P_1$, and because in Example 6, falling of the filaments of the outermost layer into the bundle-twisted cord occur, the roundness and the rubber permeability become inferior to some extent. Also, in Table 1, Related art example 1 is the case of using the steel cord of the layer-twisted structure of 3+9+15+W as shown in FIG. 3 and Related art example 2 is the case of using the steel cord of the layer-twisted structure of 3+9+14 as shown in FIG. 4.

In Table 2, Comparative Example 1 is the case of using the steel cord of the layer-twisted structure of 3Cr+9+14 as shown in FIG. 5, Comparative Example 2 is the case of using the steel cord of the layer-twisted structure of 3Cr/24 as shown in FIG. 6, and Comparative Example 3 is the case of using the steel cord of the layer-twisted structure of 3Cr+9+14 as shown in FIG. 7. Also, Comparative Example 4 is the case that the steel cord of the layer-twisted structure of 3Cr/9+14 as shown in FIG. 1 is used but the parameter F is too small, Comparative Example 5 is the case that the steel cord of the layer-twisted structure of 3Cr/9+14 as shown in FIG. 1 is used but the parameter F is too large, Comparative Example 6 is the case that the steel cord of the layer-twisted structure of 3Cr/9+14 as shown in FIG. 1 is used but the roundness b/a is too small, Comparative Example 7 is the case that the steel cord of the layer-twisted structure of 3Cr/9+14 as shown in FIG. 1 is used but the roundnesses b/a and b'/a' are too small, and Comparative Example 8 is the case of using the steel cord of the layer-twisted structure of 3Cr/9+13 as shown in FIG. 8.

As is clear from Table 1 and Table 2, it can be seen that Examples 1 to 6 of the invention are excellent in each of the rubber permeability and the fatigue resistance as compared with Related art examples 1 and 2 and Comparative Examples 1 to 8.

As described above, because the rubber reinforcing steel cord of the present invention is the steel cord of a bundle-twisted+layer-twisted structure obtained by arranging 9 steel filaments around 3 steel filaments each being two-dimensionally wave-like shaped in the lengthwise direction, intertwining all of these steel filaments in one operation to form a bundle-twisted cord, and further arranging 14 steel filaments around the bundle-twisted cord followed by intertwining, wherein when the diameter of the two-dimensionally wave-like shaped steel filament is d, the wave-form height thereof is h, and the wave form pitch thereof is P, the parameter F shown by (h–d)/P is in the relation of $0.001 \leq F \leq 0.03$ and further, the ratio b/a of the long diameter a and the short diameter b of the circumscribed circle of the cross section of the bundle-twisted cord is $0.94 \leq b/a \leq 1.00$, and the ratio b'/a' of the long diameter a' and the short diameter b' of the circumscribed circle of the cross section of the steel cord is $0.96 \leq b'/a' \leq 1.00$, it becomes possible to increase the rubber permeability, the fatigue resistance, and the productivity.

Also, the rubber reinforcing steel cord of the invention has the advantages such as (a) because the three steel filaments of the core portion are not simply arranged but are intertwined together with nine steel filaments of the sheath just outside of the core portion, when a tension is applied to the steel cord, the tension burden is not concentrated (unbiased) to the core portion, (b) by reducing the number of the steel filaments of the outermost layer to the minimum necessary number, the diameters of the steel filaments are not thickened (the fatigue resistance of the steel cord is good), (c) because the rubber permeability is good, a rap filament can be omitted, etc.

Furthermore, by using the rubber reinforcing steel cord as the cords of the carcass layers of a heavy duty pneumatic radial tire, the durability of the heavy duty pneumatic radial tire can be increased.

What is claimed is:

1. A rubber reinforcing steel cord comprising a steel cord of a bundle-twisted+layer-twisted structure obtained by arranging 9 steel filaments around 3 steel filaments, the 3 steel filaments each being two-dimensionally waved in the lengthwise direction, intertwining all of these steel filaments in one operation to form a bundle-twisted cord, and further arranging 14 steel filaments around the bundle-twisted cord followed by intertwining, wherein when the diameter of the two-dimensionally waved steel filament is d, the wave-form height thereof is h, and the wave form pitch thereof is P, the parameter F, defined by (h–d)/P is in the relation of $0.001 \leq F \leq 0.03$ and further, the ratio b/a of the long diameter a and the short diameter b of the circumscribed circle of the cross section of the bundle-twisted cord is $0.94 \leq b/a \leq 1.00$, and the ratio b'/a' of the long diameter a' and the short diameter b' of the circumscribed circle of the cross section of the steel cord is $0.96 \leq b'/a' \leq 1.00$.

2. The rubber reinforcing steel cord according to claim 1 wherein the twisting pitch $P_1$ of the bundle-twisted cord and the twisting pitch $P_2$ of the 14 filaments arranged around the bundle-twisted cord are in the relation of $P_2 \geq 2.5+P_1$.

3. A heavy duty pneumatic radial tire comprising a carcass layer of rubber reinforcing steel cords having a bundle-twisted+layer-twisted structure obtained by arranging 9 steel filaments around 3 steel filaments, the 3 steel filaments each being two-dimensionally waved in the lengthwise direction, intertwining all of these steel filaments in one operation to form a bundle-twisted cord, and further arranging 14 steel filaments around the bundle-twisted cord followed by intertwining, wherein when the diameter of the two-dimensionally waved steel filament is d, the wave-form height thereof is h, and the wave form pitch thereof is P, the parameter F defined by (h–d)/P is in the relation of $0.001 \leq F \leq 0.03$ and further, the ratio b/a of the long diameter a and the short diameter b of the circumscribed circle of the cross section of the bundle-twisted cord is $0.94 \leq b/a \leq 1.00$, and the ratio b'/a' of the long diameter a' and the short diameter b' of the circumscribed circle of the cross section of the steel cord is $0.96 \leq b'/a' \leq 1.00$.

4. The heavy duty pneumatic radial tire according to claim 3 wherein the twisting pitch $P_1$ of the bundle- twisted cord and the twisting pitch $P_2$ of the 14 filaments arranged around the bundle-twisted cord are in the relation of $P_2 \geq 2.5+P_1$.

* * * * *